(12) United States Patent
Nakajima et al.

(10) Patent No.: US 8,040,411 B2
(45) Date of Patent: Oct. 18, 2011

(54) IMAGE PICKUP DEVICE AND IMAGE PICKUP METHOD

(75) Inventors: Keisuke Nakajima, Kanagawa (JP); Hiroshi Yamamoto, Chiba (JP)

(73) Assignee: Sony Corporation, Tokyo (JP)

( * ) Notice: Subject to any disclaimer, the term of this patent is extended or adjusted under 35 U.S.C. 154(b) by 344 days.

(21) Appl. No.: 12/453,683

(22) Filed: May 19, 2009

(65) Prior Publication Data
US 2009/0295941 A1 Dec. 3, 2009

(30) Foreign Application Priority Data

Jun. 3, 2008 (JP) ................................. 2008-146232

(51) Int. Cl.
*H04N 5/202* (2006.01)
*H04N 5/235* (2006.01)
(52) U.S. Cl. ........................................ 348/254; 348/362
(58) Field of Classification Search ................ 348/222.1, 348/254–256, 362; 382/274
See application file for complete search history.

(56) References Cited

U.S. PATENT DOCUMENTS

| | | | | |
|---|---|---|---|---|
| 6,747,694 B1 * | 6/2004 | Nishikawa et al. | ......... | 348/229.1 |
| 7,639,893 B2 * | 12/2009 | Duan et al. | ..................... | 382/274 |
| 7,738,699 B2 * | 6/2010 | Tsuruoka et al. | ............. | 382/169 |
| 7,791,656 B2 * | 9/2010 | Katagiri et al. | ................ | 348/254 |
| 2004/0004666 A1 * | 1/2004 | Sano | ............................. | 348/254 |
| 2004/0179132 A1 * | 9/2004 | Fujino et al. | ................... | 348/363 |
| 2004/0201759 A1 * | 10/2004 | Horiuchi | ........................ | 348/254 |
| 2005/0180629 A1 | 8/2005 | Masuno et al. | | |
| 2006/0033823 A1 | 2/2006 | Okamura | | |
| 2006/0239582 A1 * | 10/2006 | Hyoudou | ....................... | 382/274 |
| 2007/0182830 A1 * | 8/2007 | Katagiri et al. | ............. | 348/222.1 |
| 2008/0259181 A1 * | 10/2008 | Yamashita et al. | .......... | 348/229.1 |
| 2009/0066819 A1 * | 3/2009 | Ando | .............................. | 348/254 |
| 2009/0161953 A1 * | 6/2009 | Ciurea et al. | ................... | 382/172 |
| 2010/0309346 A1 * | 12/2010 | Brunner et al. | ............... | 348/254 |

FOREIGN PATENT DOCUMENTS

| | | |
|---|---|---|
| JP | 2004-056573 | 2/2004 |
| JP | 2004-120205 | 4/2004 |
| JP | 2005-204195 | 7/2005 |

* cited by examiner

*Primary Examiner* — Timothy J Henn
(74) *Attorney, Agent, or Firm* — Rader, Fishman & Grauer PLLC

(57) ABSTRACT

An image pickup device includes an image pickup section that picks up a long-time exposure image and short-time exposure image; a combining section that combines the long-time exposure image and short-time exposure image with each other, to generate a combined image, the exposure images being combined on the basis of a ratio between the exposure time of the long-time exposure image and the exposure time of the short-time exposure image; a dynamic range calculating section that calculates an object dynamic range from the long-time exposure image, the exposure time of the long-time exposure image, the short-time exposure image, and the exposure time of the short-time exposure image; and a compressing section that, using base compression curve data, calculates a compression curve suitable for the object dynamic range, and generates a compressed image in accordance with the calculated compression curve.

9 Claims, 12 Drawing Sheets

FIG. 5
FIG. 5 (A)
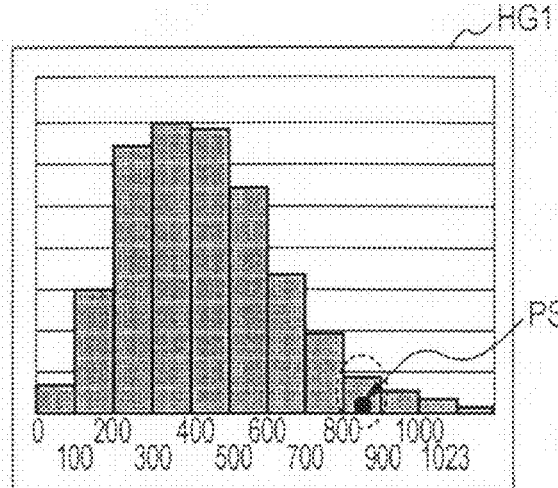
FIG. 5 (B)
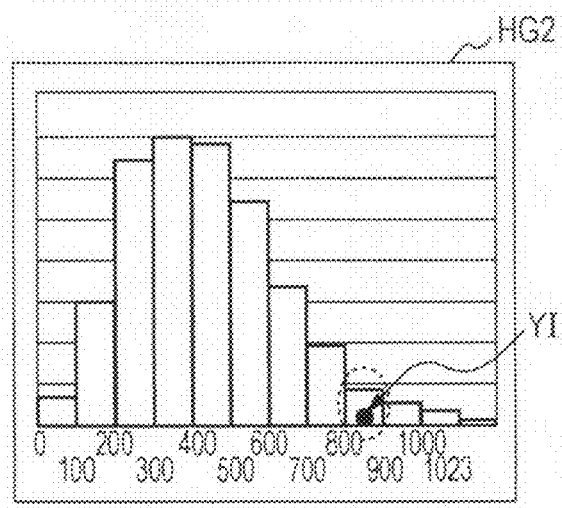
FIG. 5(C)
| DIVISION THRESHOLD VALUE | PIXEL NUMBER INTEGRATION | BRIGHTNESS INTEGRATION |
|---|---|---|
| 0 | 300 | 15000 |
| 100 | 400 | 60000 |
| 200 | 500 | 125000 |
| 300 | 400 | 140000 |
| 400 | 300 | 135000 |
| 500 | 200 | 110000 |
| 600 | 100 | 65000 |
| 700 | 50 | 37500 |
| 800 | 20 | 17000 |
| 900 | 10 | 9500 |
| 1000 | 5 | 5057.5 |
| 1023 | 2 | 2046 |

FIG. 8
FIG. 8(A)
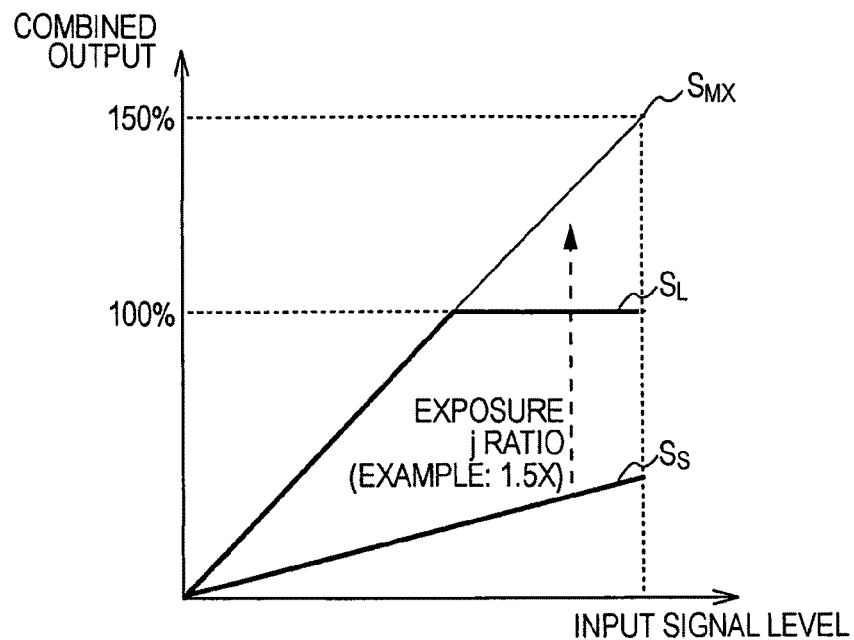
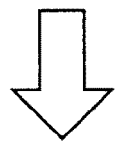
FIG. 8(B)
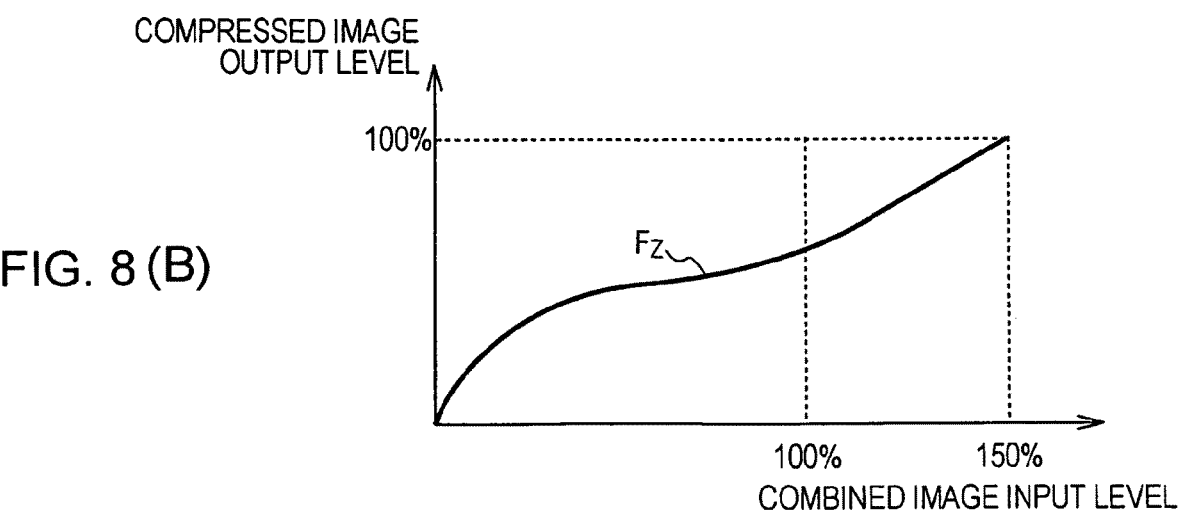

IMAGE PICKUP DEVICE AND IMAGE PICKUP METHOD

BACKGROUND OF THE INVENTION

1. Field of the Invention

The present invention relates to an image pickup device and an image pickup method for shooting an object in a wide dynamic range by combining images having two types of exposure times.

2. Description of the Related Art

In a related image pickup device using a solid-state image pickup element, such as a charge coupled device (CCD), a light quantity (exposure amount) input to the image pickup element is adjusted by a stop or on the basis of an electronic shutter speed. That is, when a bright scene is picked up, in order to prevent what is called overexposure (in which an output signal of the image pickup element is saturated) from occurring, the exposure amount is reduced. In contrast, for a dark scene, in order to prevent what is called underexposure from occurring, the exposure amount is adjusted to a large exposure amount.

However, when a scene 5 having a large difference in brightness is picked up (that is, when a backlight image pickup operation is performed or indoor and outdoor pickup operations are simultaneously performed), since a dynamic range of the solid-state image pickup element that is used is insufficient, merely adjusting the exposure amount results in overexposure caused by saturation of the bright portion, or underexposure at the dark portion. Therefore, both portions cannot be properly reproduced.

For overcoming this problem, the following image pickup device is available. In the image pickup device, on the basis of a short-time exposure image and a long-time exposure image obtained by an image pickup section, after performing a gain operation or an offset operation on the short-time exposure image, the short-time exposure image is combined with the long-time exposure image. Then, a level compression operation is performed on the combined image, to obtain a combined image in a wide dynamic range.

For example, the following image pickup devices are proposed (refer to, for example, Japanese Unexamined Patent Application Publication Nos. 2004-56573 and 2004-120205). In one of the image pickup devices, when the short-time exposure image and the long-time exposure image are combined with each other, and the combined image is compressed to generate an image in a wide dynamic range, the short-time exposure image is subjected to multiple addition operations for a few fields. This image subjected to the multiple addition operations is combined with the long-time exposure image as an intermediate-time exposure image, to generate an image in a wide dynamic range. This makes it possible to effectively prevent a reduction in the S/N ratio at an intermediate input level. In the other image pickup device, dynamic ranges assigned to the respective long-time exposure image and short-time exposure image are dynamically changed using a histogram, to reproduce an image under optimal conditions, such as with optical gradation and exposure.

Further, the following image processing device is proposed (refer to, for example, Japanese Unexamined Patent Application Publication No. 2005-204195). In the image processing device, for changing gradation in accordance with a change in brightness for each frame of a dynamic image, brightness area information that represents the width of a brightness distribution of an image is calculated. On the basis of smoothed brightness area information in which the calculated brightness area information is smoothed in times-series, the brightness of the image is normalized in accordance with a brightness area of a display device that displays the image.

SUMMARY OF THE INVENTION

In the image pickup device proposed above that dynamically changes a proportion of a high-brightness dynamic range and those of an intermediate-brightness dynamic range and a low-brightness dynamic range using a histogram, brightness portions are divided into two portions, that is, a high-brightness portion and a low-brightness portion, with reference to a threshold value used for selecting either one of the short-time exposure image and the long-time exposure image. Compression is performed at a compression rate as indicated in a line graph, thereby causing an unnatural boundary to be formed. Further, when an exposure ratio between the long-time exposure image and the short-time exposure image is very large, and the gradation changes continuously, it is difficult to sufficiently reproduce the gradation of an intermediate area in the method that uses two portions.

The method of performing a dynamic range compression at a smooth compression curve in which many output ranges are assigned to brightness areas having many distributions is an excellent method, but the scale of a device and the number of calculations are large. Therefore, this method is not suitable for a low-cost device type.

In view of the above-described problems, it is desirable to provide an image pickup device and an image pickup method that can generate an image subjected to a gradation compression operation suitable for a dynamic range of an object by a simple controlling operation.

Further aims and specific advantages obtained by the present invention will become apparent from the description of embodiments below.

In the present invention, when an object in a wide dynamic range is shot by combining images having two types of exposure times, the dynamic range of the object is estimated from the two types of image exposure times, to perform a gradation compression operation suitable for the dynamic range. Generation of a compression curve depends only upon the dynamic range of the object. Therefore, by combination with automatic exposure control (AE), using the same method, in which a base compression curve is interpolated between a location where the dynamic range of the object is small and a location where it is large, it is possible to perform a gradation compression operation suitable for the dynamic range of the object by a very simple controlling operation in which the dynamic range of the object is detected by the AE operation and compression is performed in accordance with the dynamic range.

According to an embodiment of the present invention, there is provided an image pickup device including at least an image pickup section that picks up a long-time exposure image having a relatively long exposure time and a short-time exposure image having a relatively short exposure time; a combining section that combines the long-time exposure image and the short-time exposure image, obtained by the image pickup section, with each other, to generate a combined image, the exposure images being combined with each other on the basis of a ratio between the exposure time of the long-time exposure image and the exposure time of the short-time exposure image; a dynamic range calculating section that calculates a dynamic range of an object for the combined image generated at the combining section from the long-time exposure image used in the combining operation, the exposure time of the long-time exposure image, the short-time exposure image used in the combining operation, and the exposure time of the short-time exposure image; a storage section that holds base compression curve data corresponding to a few types of dynamic ranges; and a compressing section that, using the base compression curve data held in the storage section, calculates a compression curve suitable for the dynamic range of the object calculated by the dynamic range calculating section, and that generates a compressed image in accordance with the calculated compression curve, the compressed image being generated by compressing the combined image generated by the combining section, wherein an image subjected to a gradation compression operation in accordance with the dynamic range of the object is generated from the long-time exposure image and the short-time exposure image obtained by the image pickup section.

In the image pickup device according to the embodiment of the present invention, the dynamic range calculating section may, for example, previously determine a maximum value of the dynamic range of the object that is capable of being represented by the long-time exposure image, and multiply the ratio between the exposure time of the long-time exposure image and the exposure time of the short-time exposure image, to calculate the dynamic range of the object picked up by the image pickup section.

In the image pickup device according to the embodiment of the present invention, the dynamic range calculating section may, for example, calculate a proportion with respect to a saturation level of the long-time exposure image from a maximum brightness value of the long-time exposure image, and multiply the proportion with the dynamic range of the object that is capable of being represented by the long-time exposure image, to calculate the dynamic range of the object picked up by the image pickup section.

In the image pickup device according to the embodiment of the present invention, for example, using a histogram, formed from the obtained long-time exposure image, and brightness integration values corresponding thereto, the dynamic range calculating section may detect the brightness integration value and the number of pixels in the histogram including a specified nth pixel when counting the integration values in order of a larger brightness value to a smaller brightness value, and may divide the brightness integration value in an area thereof by the number of pixels, to calculate an average brightness value that is set as the maximum brightness value of the long-time exposure image.

In the image pickup device according to the embodiment of the present invention, the compressing section may include, for example, compression curve generating means for selecting and reading out two types of the base compression curve data that are closest to the dynamic range of the object, and performing interpolation in terms of the two types of base compression curve data on the basis of the dynamic range of the object, to generate a suitable compression curve, wherein, in accordance with the compression curve generated by the compression curve generating means, the compressing section generates the compressed image formed by compressing the combined image generated by the combining section.

The image pickup device according to the embodiment of the present invention may further include, for example, a contour correcting section including combined image high-frequency component detecting means for detecting a high-frequency component of the combined image generated by the combining section, gain controlling means for performing gain control of the high-frequency component of the combined image by applying gain to the high-frequency component of the combined image detected by the combined image high-frequency component detecting means, the gain being in accordance with a brightness level of the combined image or a brightness level of the compressed image generated by the compressing section, and high-frequency component adding means for adding the high-frequency component of the combined image subjected to the gain control by the gain controlling means to the compressed image generated by the compressing means.

The image pickup device according to the embodiment of the present invention may further include, for example, a contour correcting section including long-time exposure high-frequency component detecting means for detecting a high-frequency component of the long-time exposure image used in the combining operation at the combining section, short-time exposure high-frequency component detecting means for detecting a high-frequency component of the short-time exposure image used in the combining operation at the combining section, and high-frequency component adding means for adding to the compressed image the long-time exposure high-frequency component detected by the long-time exposure high-frequency component detecting means or the short-time exposure component detected by the short-time exposure high-frequency component detecting means so as to correspond to a pixel used from the long-time exposure image or the short-time exposure image, combined by the combining section.

In the image pickup device according to the embodiment of the present invention, the contour correcting section may further include, for example, gain controlling means for performing gain control on the high-frequency component, which is added to the compressed image by the high-frequency component adding means, by applying gain to the high-frequency component, the gain corresponding to a brightness level of the combined image generated by the combining section or a brightness level of the compressed image generated by the compressing section.

According to another embodiment of the present invention, there is provided an image pickup method including at least the steps of picking up a long-time exposure image having a relatively long exposure time and a short-time exposure image having a relatively short exposure time with an image pickup section; generating a combined image by combining the obtained long-time exposure image and short-time exposure image with each other on the basis of a ratio between the exposure time of the long-time exposure image and the exposure time of the short-time exposure image; calculating a dynamic range of an object from the long-time exposure image used in the combining operation, the exposure time of the long-time exposure image, the short-time exposure image used in the combining operation, and the exposure time of the short-time exposure image; and generating a compressed image by calculating a compression curve suitable for the calculated dynamic range of the object using base compression curve data held in a storage section, and by compressing the combined image, generated in the step of generating the combined image, in accordance with the calculated compression curve, wherein an image subjected to a gradation compression operation in accordance with the dynamic range of the object is generated from the long-time exposure image and the short-time exposure image obtained by the image pickup step.

In the present invention, generation of a compression curve depends only upon the dynamic range of the object. Therefore, by combination with automatic exposure control (AE), using the same method, in which a base compression curve is interpolated between a location where the dynamic range of the object is small and a location where it is large, it is possible to perform a gradation compression operation suitable for the dynamic range of the object by a very simple controlling operation in which the dynamic range of the object is detected by the AE operation and compression is performed in accordance with the dynamic range.

In the present invention, since the upper limit of the dynamic range is determined by the upper limit of the curve stored in the storage section, it is possible to use any dynamic range.

In addition, in the present invention, if the curve stored in the storage section is formed in accordance with JEITA rules considering AE characteristics, it is possible to provide the best gradation when information of a specification is measured.

Further, in the present invention, the way in which a dynamic range of the entire combined image is to be compressed is determined with respect to an image formed by combining the long-time exposure image and the short-time exposure image with each other so as to be as straight as possible in accordance with an exposure time. Therefore, if a smooth base compression curve is formed, an image that is formed is output as an image subjected to smooth compression.

Even for one image that is not combined, the dynamic range is compressed by a similar controlling method.

Still further, in the present invention, the method using a histogram for detecting a maximum brightness value makes it possible to reduce the influence of noise, and to compress gradation excluding gradations, such as that of a point source, that are unnecessary.

BRIEF DESCRIPTION OF THE DRAWINGS

FIGS. 5A to 5C illustrate a detecting process of a maximum brightness value of the long-time exposure image, the detecting process using a histogram and being executed in the controlling section of the image pickup device;

FIGS. 8A and 8B schematically show changes in signal levels from when a combined image is formed to when a compressed image is formed in a signal processing section of the image pickup device;

DESCRIPTION OF THE PREFERRED EMBODIMENTS

An embodiment of the present invention will hereunder be described in detail with reference to the drawings. The present invention is not limited to the following embodiment. It is obvious that modifications may be arbitrarily made without departing from the gist of the present invention.

Figure 1:
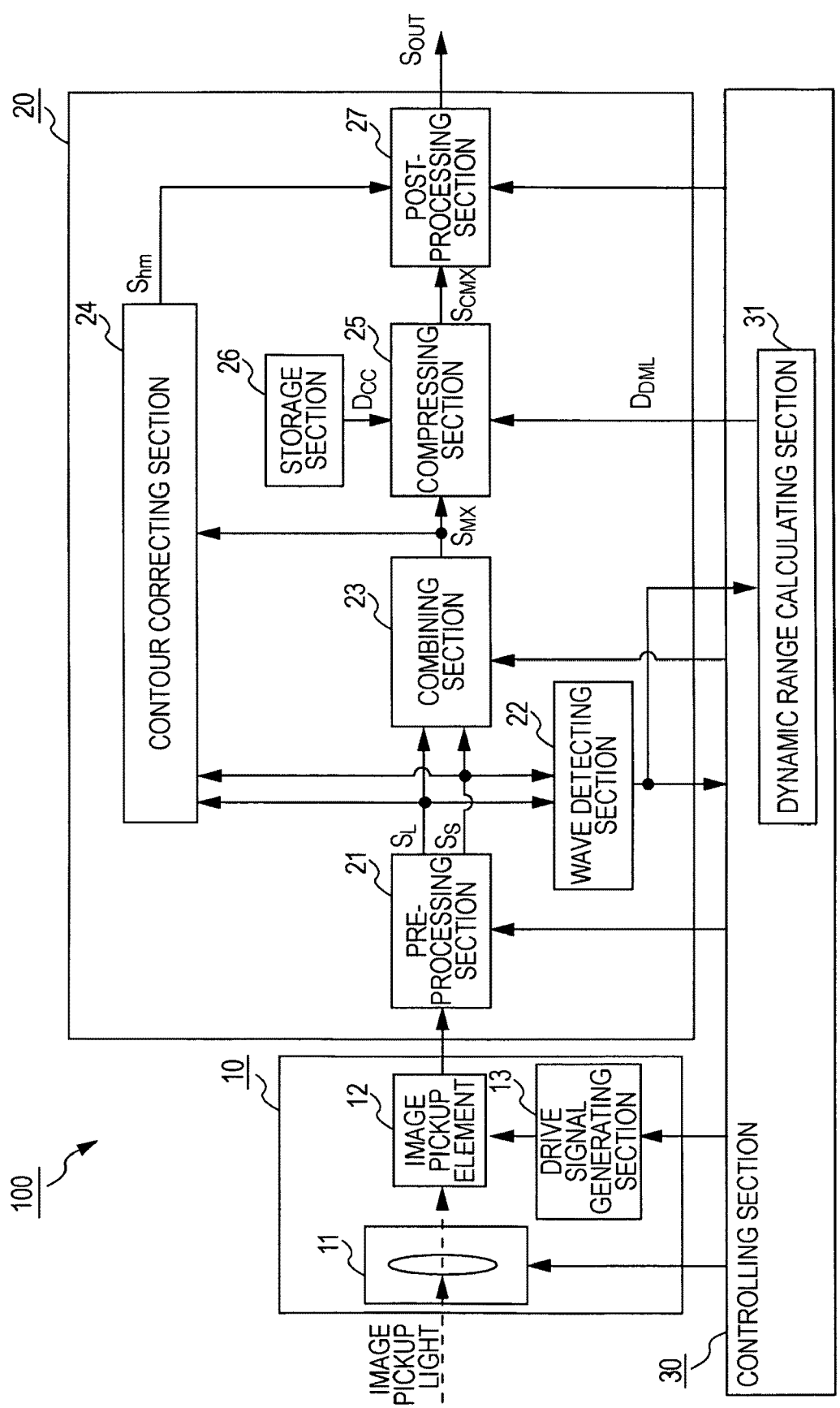
FIG. 1 is a block diagram of the structure of an image pickup device to which the present invention is applied.

The present invention is applied to, for example, an image pickup device 100 having the structure shown in FIG. 1.

The image pickup device 100 includes an image pickup section 10 that picks up an object, a signal processing section 20 that processes an image signal obtained by the image pickup section 10, and a controlling section 30 that controls operations thereof.

The image pickup section 10 includes, for example, an image pickup optical system 11, an image pickup element 12, and a drive signal generating section 13. The image pickup optical system 11 includes optical components, such as a taking lens, an optical filter that removes undesired wavelengths, and a stop. The image pickup element 12 has its image pickup surface irradiated with light incident thereupon from an object, through the image pickup optical system 11. The drive signal generating section 13 generates a drive signal for driving the image pickup element 12.

The image pickup element 12 is a solid-state image pickup element, such as a charge-coupled-device (CCD) image sensor or a complementary-metal-oxide-semiconductor image sensor, and is driven on the basis of the drive signal generated by the drive signal generating section 13.

Figure 2:
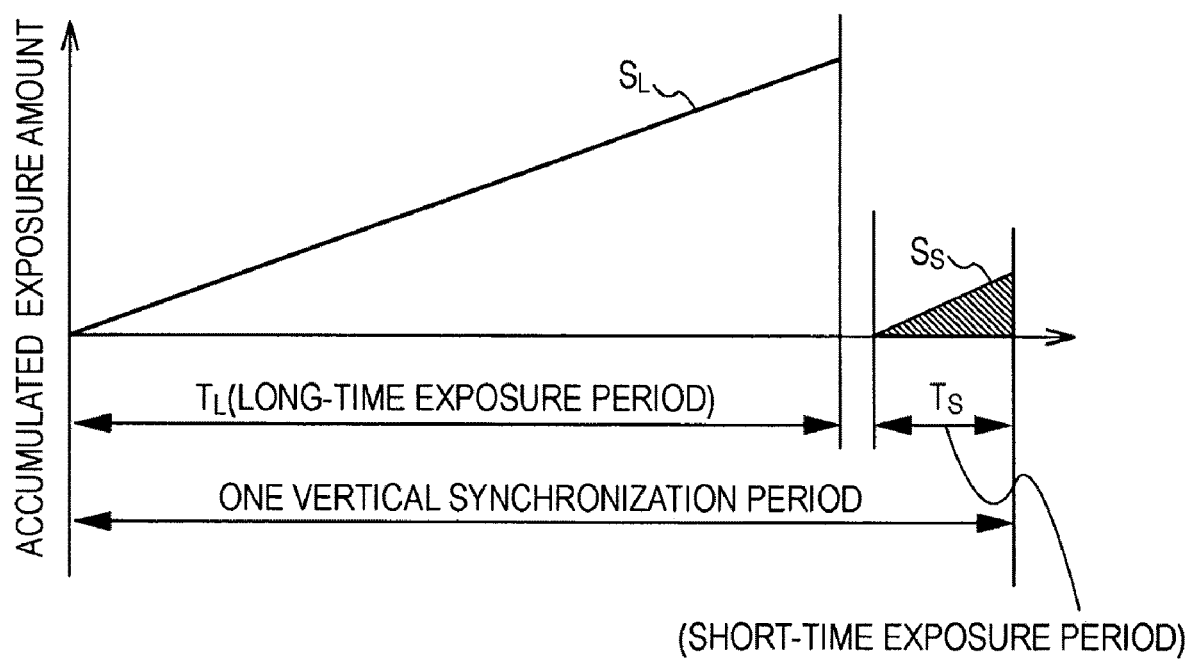
FIG. 2 shows a graph of long-time exposure and short-time exposure in the image pickup device.

As shown in FIG. 2, during one vertical synchronization period, the image pickup element 12 of the image pickup device 10 performs long-time exposure and short-time exposure, and electrical signals, serving as a long-time exposure image signal $S_L$ and a short-time exposure image signal $S_S$, are subjected to a time-sharing output operation. The image pickup element 12 includes, for example, an interline transfer type CCD image sensor in which the number of vertical transfer stages is twice the ordinary number of vertical transfer stages. Within a vertical blanking period in every one vertical synchronization period, image pickup electric charge read-out operations are performed twice to the vertical transfer stages from a photoelectric conversion section, and the image pickup electric charges that are read out to the vertical transfer stages during the two read-out operations are transferred. This causes a signal electric charge for the long-time exposure and a signal electric charge for the short-time exposure to be aligned side by side at the vertical transfer stages just before the beginning of a vertical effective period. When the image pickup electric charges are read out by driving a horizontal transfer stage at twice the speed, the long-time exposure signal and the short-time exposure signal for one row are output during one horizontal synchronization period. Accordingly, a long-time exposure signal and a short-time exposure signal for a first row, a long-time exposure signal and a short-time exposure signal for a second row, a long-time exposure signal and a short-time exposure signal for a third row, etc., are successively output.

FIG. 2 shows exposure time within one vertical synchronization period and an exposure amount (electric charge quantity) that is accumulated in the image pickup element 12.

FIG. 2 shows the case in which long-time exposure of 1/64 seconds and short-time exposure of 1/2000 seconds are performed in one vertical synchronization period of 1/60 seconds. The long-time exposure time and the short-time exposure time can be subjected to variable control.

By performing the long-time exposure and the short-time exposure, the long-time exposure image signal $S_L$ and the short-time exposure image signal $S_S$ are obtained during one vertical synchronization period. By combining both image signals, image-pickup image data for one field is generated.

It is not necessary to perform the long-time exposure and the short-time exposure in one vertical synchronization period. The long-time exposure may be performed in a certain vertical synchronization period, and the short-time exposure may be performed in the next vertical synchronization period, to combine the exposure image signals.

The structure of the image pickup element 12 is not limited to the structure using a solid-state image pickup element. For example, a nonsolid-state image pickup element, such as an image pickup tube, may also be used in the structure of the image pickup element 12. Even with a nonsolid-state image pickup element, using, for example, a mechanical shutter or a liquid-crystal shutter, it is possible to perform the long-time exposure or the short-time exposure, or to change ordinary exposure, the long-time exposure, or the short-time exposure.

The signal processing section 20 includes, for example, a pre-processing section 21, a wave detecting section 22, a combining section 23, a contour correcting section 24, a compressing section 25, a storage section 26, and a post-processing section 27. The image signal obtained by the image pickup section 10 is supplied to the pre-processing section 21.

The pre-processing section 21 is what is called an analog front end. It performs various operations, such as a correlated double sampling (CDS) operation with respect to an electrical signal (or an image-pickup image) output from the image pickup section 10; a gain operation performed by a programmable gain amplifier; A/D conversion; clamping; black-label correction; and defect correction. The pre-processing section 21 pre-processes the image signal obtained by the image pickup section 10, to output the long-time exposure image data $S_L$ and the short-time exposure image data $S_S$ that are obtained.

The long-time exposure image data $S_L$ and the short-time exposure image data $S_S$ that are obtained by the pre-processing section 21 are supplied to the wave detecting section 22, the combining section 23, and the contour correcting section 24.

For the long-time exposure image data $S_L$ and the short-time exposure image data $S_S$ that are supplied from the pre-processing section 21, the wave detecting section 22, for example, calculates respective brightness levels for automatic exposure correction (AE) and generates a histogram. Then, the wave detecting section 22 supplies data of the calculated brightness levels and the histogram to the controlling section 30.

The controlling section 30 includes a microcomputer. On the basis of the data calculated at the wave detecting section 22, the controlling section 30 calculates a stop control value of the image pickup optical system 11 or electronic shutter values that are set at the drive signal generating section 13 of the image pickup section 10. Then, the controlling section 30 controls the operation of the image pickup section 10 on the basis of the calculated results. On the basis of electronic the shutter values for the long-time exposure and the short-time exposure, the controlling section 30 calculates combination gain for combining the long-time exposure image and the short-time exposure image at the combining section 23. Then, on the basis of the calculated results, the controlling section 30 controls the operation of the combining section 23. The controlling section 30 including the microcomputer includes a dynamic range calculating section 31 that calculates a dynamic range value of an object on the basis of an electronic shutter ratio between the long-time exposure and the short-time exposure and the histogram.

For a combined image generated at the combining section 23, the dynamic range calculating section 31 of the controlling section 30 calculates a dynamic range value $D_{DML}$ of the object from the long-time exposure image data $S_L$ used for the combining operation, an exposure time $T_L$ of the long-time exposure image, the short-time exposure image data $S_S$ used for the combining operation, and an exposure time $T_S$ of the short-time exposure image. The calculated dynamic range value $D_{DML}$ is supplied to the compressing section 25.

The combining section 23 to which the long-time exposure image data $S_L$ and the short-time exposure image data $S_S$ are supplied from the pre-processing section 21 combines the long-time exposure image and the short-time exposure image indicated by the long-time exposure image data $S_L$ and the short-time exposure image data $S_S$ (that is, the long-time exposure image and the short-time exposure image obtained by the image pickup section 10) with each other to generate a combined image on the basis of a ratio between the exposure time $T_L$ of the long-time exposure image and the exposure time $T_S$ of the short-time exposure image. In accordance with the combination gain applied by the controlling section 30, the short-time exposure image is expanded, to form a combined linear image in which the long-time exposure image is naturally connected with the short-time exposure image.

Combined image data $S_{MX}$ obtained by the combining section 23 is supplied to the contour correcting section 24 and the compressing section 25.

The compressing section 25 selects two types of curves that are closest to the dynamic range value from the storage section 26 that stores compression curve data corresponding to discrete dynamic ranges. Then, on the basis of the dynamic range value $D_{DML}$ provided by the dynamic range calculating section 31 of the controlling section 30, interpolation is performed to form a compression curve. Thereafter, in accordance with the formed compression curve, a compressed image in which the combined image generated by the combining section 23 is compressed is generated.

The post-processing section 27 performs post-processing, such as YC processing, on compressed image data $S_{CMX}$ obtained by the compressing section 25, and outputs an image signal based on the compressed image data.

In the image pickup device 100, the contour correcting section 24 of the signal processing section 20 detects a high-frequency component of an image provided prior to compressing it by the compressing section 25 (such as a high-frequency component of the combined image data $S_{MX}$ supplied from the combining section 23, or a high-frequency component of the short-time exposure image data $S_H$ and a high-frequency component of the long-time exposure image data $S_L$ supplied from the combining section 23. Then, the contour correcting section 24 supplies the detected high-frequency component as a high frequency component $S_{hm}$ for contour correction to the post-processing section 27. Thereafter, in the post-processing section 27, the high-frequency component is added to compressed image data $S_{CMX}$ generated by the compressing section 25, to correct the contour.

That is, when the short-time exposure image and the long-time exposure image are combined with each other, the combined image is compressed, and a wide dynamic range image is generated, the high-frequency component of the image provided prior to compressing it by the compressing section 25 is detected, and the high-frequency component is added to the compressed image data $S_{CMX}$ generated by the compressing section 25. This makes it possible to enhance the contour, in which detection is difficult after compressing the image.

The specific structure and operation of the aforementioned contour correcting section 24 will be described in detail later with reference to FIGS. 10 to 13.

Figure 3:
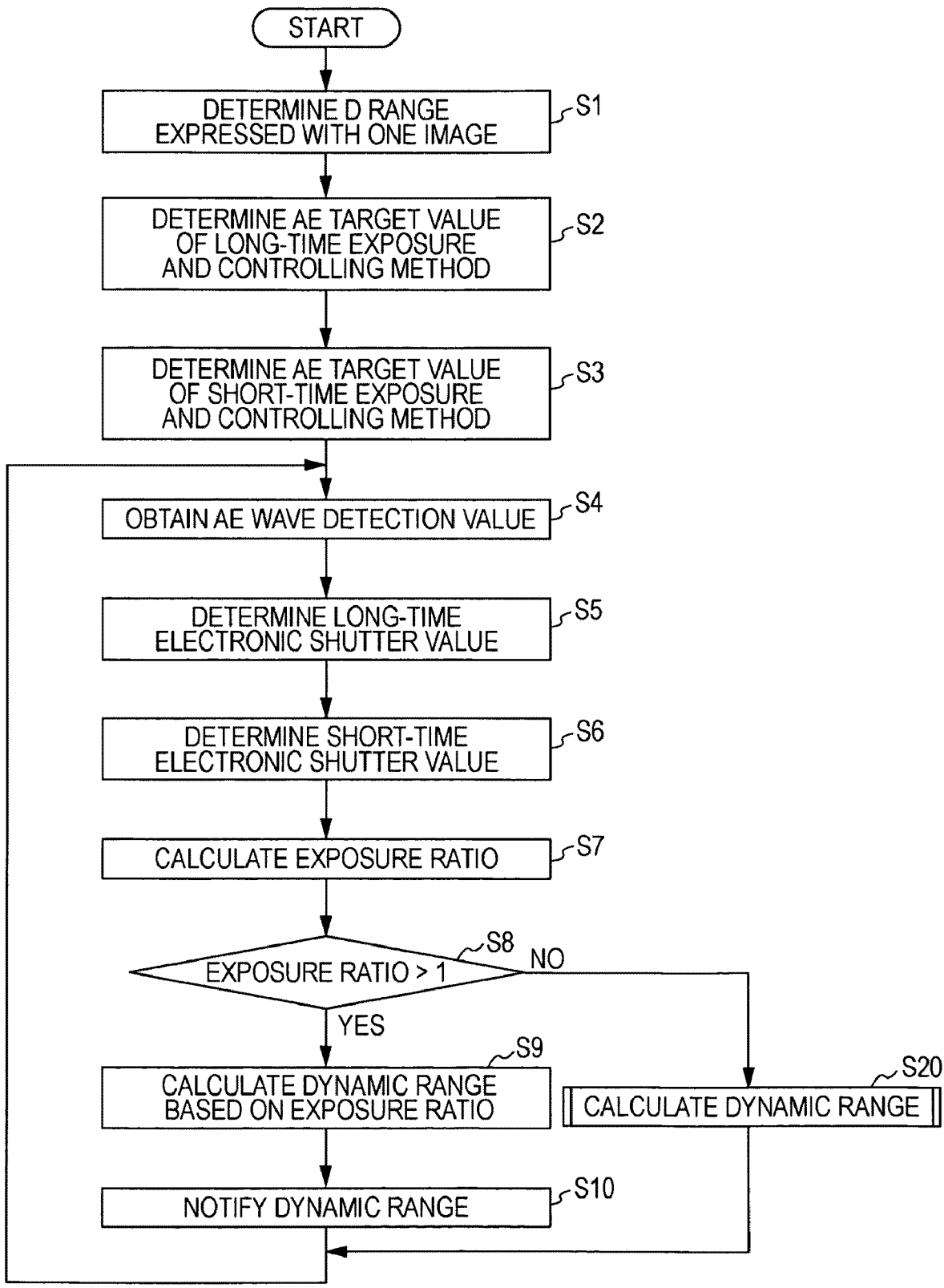
FIG. 3 is a flowchart showing the process of calculating a dynamic range of an object from a long-time exposure image and a short-time exposure image, the calculating process being executed in a controlling section of the image pickup device having the function of a dynamic range calculating section.

In the image pickup device 100, the dynamic range calculating section 31 of the controlling section 30 including the microcomputer calculates, for example, the dynamic range of the object from the long-time exposure image and the short-time exposure image in accordance with the process shown in the flowchart of FIG. 3.

That is, the controlling section 30 previously determines the dynamic range that can be represented only by the long-time exposure image. It is determined that, for example, a dynamic range of 6× of a dynamic-range enlargement ratio prescribed in Rules of Specification for Closed Circuit Television Equipment (JEITA TTR-4602B) can be shot in terms of a long-time exposure image (Step S1).

Then, the controlling section 30 determines an AE target value for long-time exposure and a controlling method, and controls an electronic shutter of the image pickup section 10 by performing an operation that is equivalent to what is called "backlight correction" so that data of shooting an object in a dynamic range 1× is input for approximately ⅙ of a maximum range after A/D conversion when AE for obtaining the long-time exposure image is performed (Step S2).

The controlling section 30 determines an AE target value for short-time exposure and a controlling method, and controls the electronic shutter of the image pickup section 10 by performing an operation that is equivalent to what is called "excessive front light correction" so that the short-time exposure image does not have a saturated portion when shooting the object (Step S3).

Next, the controlling section 10 obtains an AE wave detection value from the wave detecting section 25 for each frame (Step S4). Then, in accordance with the controlling methods determined in Steps S2 and S3, the next long-time electronic shutter set value and the next short-time electronic shutter set value are calculated, to set them at the drive signal generating section 13 of the image pickup section 10 (Steps S5 and S6).

Then, the dynamic range calculating section 31 of the controlling section 10 calculates an exposure ratio between the exposure time $T_L$ of the long-time exposure image and the exposure time $T_S$ of the short-time exposure image using the following expression (Step S7):

$$\text{Exposure ratio} = T_L/T_S$$

Then, it is determined whether or not the calculated exposure ratio is greater than 1 (Step S8).

Next, when the determination result in Step S8 is "yes," that is, when the exposure ratio is greater than 1, the dynamic range calculating section 31 makes use of a dynamic range that is six times that determined in Step S1 in terms of the exposure ratio that is greater than 1:

$$\text{Exposure ratio} \times 6 = \text{Dynamic range}$$

The dynamic range value $D_{DML}$ of when the short-time exposure image and the long-time exposure image are combined with each other is determined (Step S9), and the compressing section 25 is notified about the determined dynamic range value $D_{DML}$ (Step S10). Then, the process returns to Step S4.

Figure 4:
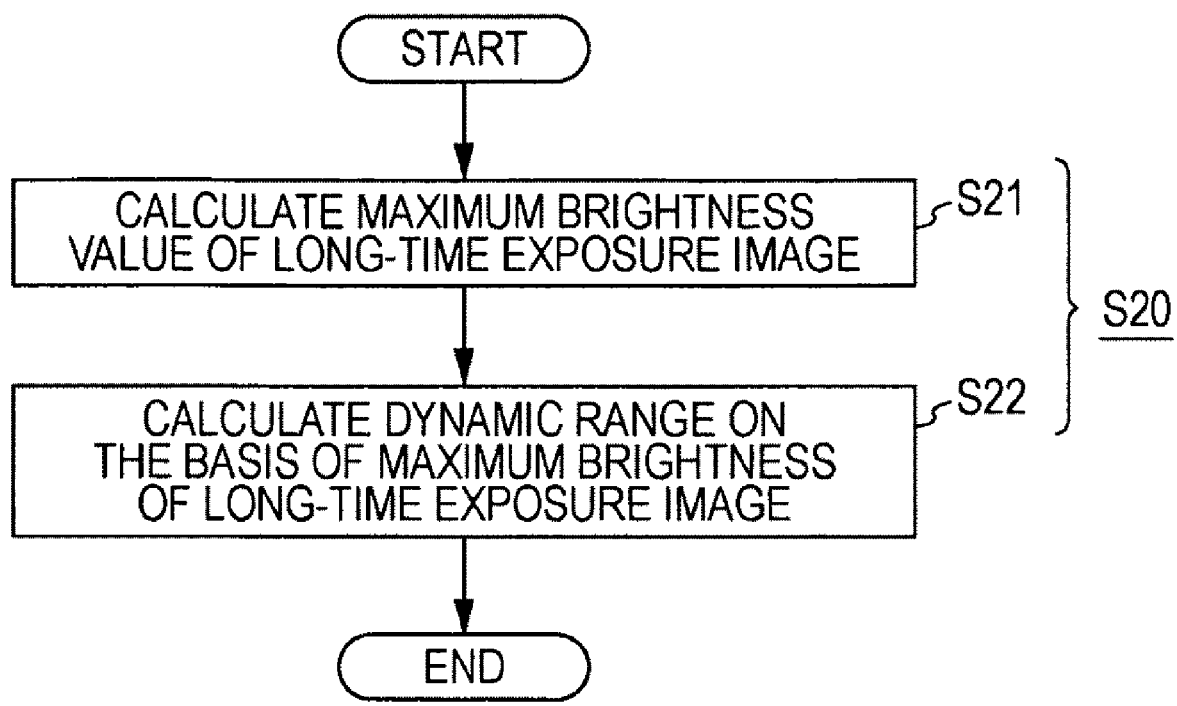
FIG. 4 is a flowchart showing the process of calculating the dynamic range of the object that can be represented only by the long-time exposure image, the calculating process being executed in the controlling section of the image pickup device.

In contrast, when the determination result in Step S8 is "no," that is, when the exposure ratio calculated in Step S7 is less than 1, it is determined that the object is one that can be represented by only the long-time exposure image. In accordance with the process shown in the flowchart of FIG. 4, the dynamic range value $D_{DML}$ is calculated (Step S20), and the compressing section 25 is notified about the determined dynamic range value $D_{DML}$ (Step S10). Then, the process returns to Step S4.

That is, the controlling section 10 repeats the operations from Steps S4 to S10. In Step S4, the AE wave detection value is obtained from the wave detecting section 25 for each frame. Then, the compressing section 25 is notified about the dynamic range value $D_{DML}$ determined in Step S10.

Then, the compressing section 25 performs a gradation compressing operation in accordance with the dynamic range value $D_{DML}$ about which the compressing section 25 is notified by the dynamic range calculating section 31.

Here, the calculation of the dynamic range value $D_{DML}$ in Step S20 is basically an operation that is executed when the controlling section 10 performs operations that are equivalent to those shown in FIG. 3, and it is determined in Step S8 that the object can be represented by only the long-time exposure image at an exposure ratio that is equal to or less than 1. The dynamic range calculating section 31 of the controlling section 10 calculates a maximum brightness value $Y_{LMAX}$ of the calculated long-time exposure image (Step S21), and, on the basis of the calculated maximum brightness value $Y_{LMAX}$ of the long-time exposure image, calculates a maximum brightness value $Y_{MAX1}$ for when the dynamic range is 1× from a dynamic range for when it is determined that the object is capable of being represented by only the long-time exposure image:

$$Y_{LMAX}/Y_{MAX1} = D_{DML}$$

By this, the dynamic range value $D_{DML}$ of the object is determined (Step S22).

Here, the maximum brightness value of the long-time exposure image may be detected by simply detecting a point where the brightness of the long-time exposure image is the highest. However, when one point is only detected and made use of, a particular point that is influenced by noise or has a pixel defect is detected. This may result in an unstable operation.

Accordingly, for example, as shown in FIG. 5, a histogram is used to make it possible to stably detect the maximum brightness of the long-time exposure image.

That is, for pixels detected with the same division threshold values in the same detection areas, the wave detecting section 22 performs integration for the number of pixels and integration for brightness. Integration values for the number of pixels and integration values for the brightness, corresponding to the respective division threshold values, shown in FIG. 5C; a histogram HG1 of the integration values for the brightness shown in FIG. 5A; and a histogram HG2 of the integration values for the number of pixels shown in FIG. 5B are provided.

When, for example, a point source, such as a light bulb, is included in an object having a relatively narrow dynamic range, it is not necessary to reproduce the gradation of the point source. Therefore, a detection threshold value is determined, so that, for example, it is not necessary to reproduce the gradation of a highly bright object whose number of pixels is equal to or less than a certain number of pixels (for example, a highly bright object in an area whose number of pixels is equal to or less than 0.4% of the number of effective pixels.

Then, the dynamic range calculating section 31 of the controlling section 10 makes use of the histogram HG2, counts from a side having high brightness, and detects a brightness integration section YI and a pixel integration section PS including pixels corresponding to the detection threshold value.

The brightness integration value detected as a value of the brightness integration section YI and the number of pixels detected as a value of the pixel integration section PS are used, and an average brightness is calculated as follows:

Brightness integration value/number of pixels=Average brightness

The average brightness is detected as the maximum brightness value.

By using such a detection method, it is no longer necessary to detect a particular point as a location having maximum brightness. Accordingly, it is possible to reproduce gradation without considering a small portion having high brightness, such as a point source. In addition, as the number of histograms is increased, it is possible to improve the precision of the brightness value that is detected.

Figure 6:
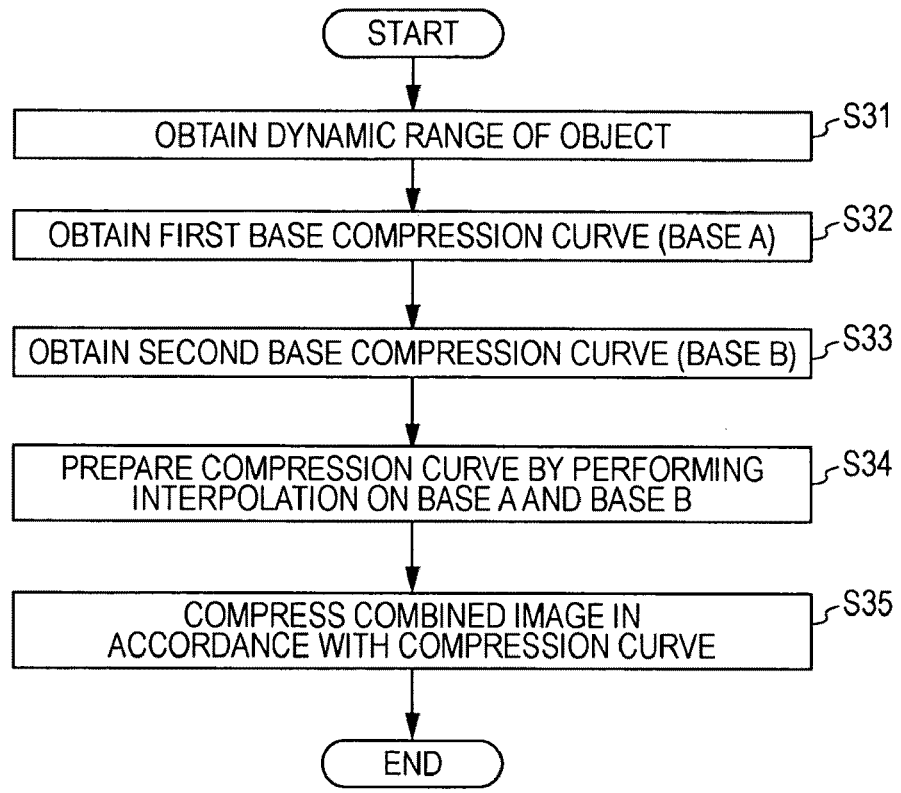
FIG. 6 is a flowchart showing a compression process executed in a compressing section of the image pickup device.

In accordance with the process of the flowchart shown in FIG. 6, the compressing section 25 reads out a base compression curve from the storage section 26 on the basis of the dynamic range value $D_{DML}$ of the object, and forms an optimal compression curve.

That is, the compressing section 25 obtains the dynamic range value $D_{DML}$ of the object calculated by the dynamic range calculating section 31 of the controlling section 30 (Step S31). Then, on the basis of the obtained dynamic range value $D_{DML}$ of the object, the compressing section 25 obtains a first base compression curve (base A) and a second base compression curve (base B) from the storage section 26 (Steps S32 and S33). The first base compression curve is of a dynamic range that is greater than and closest to the obtained dynamic range of the object. The second base compression curve is of a dynamic range that is less than and closest to the obtained dynamic range $D_{DML}$ of the object.

Figure 7:
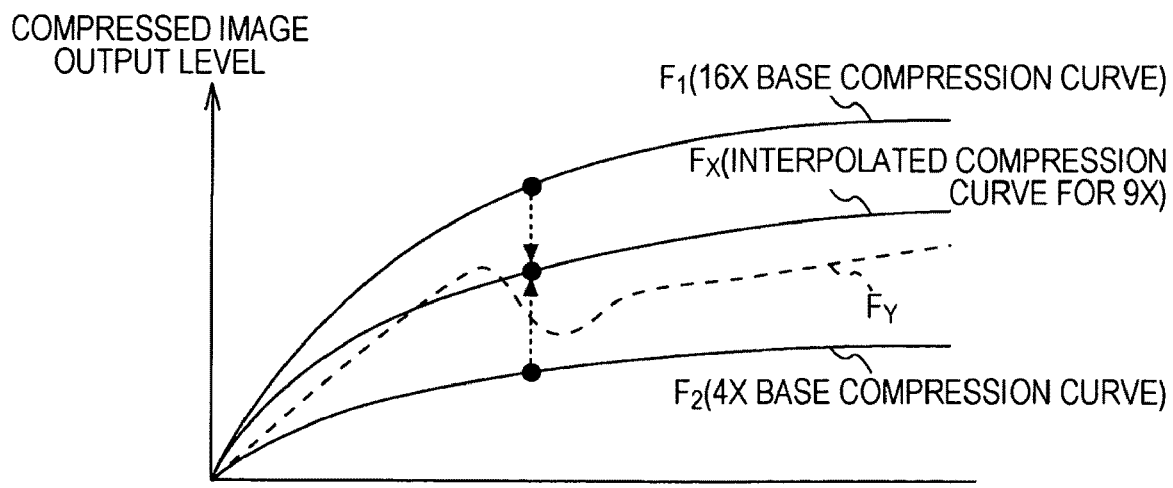
FIG. 7 shows a graph illustrating the formation of compression curves used at the compressing section of the image pickup device.

Here, the storage section 26 previously stores compression curves corresponding to discrete magnifications such as dynamic ranges of 1×, 4×, 16×, and 64×. Although a compression curve of any form may be used, a compression curve may be formed so that, for example, when AE is ideally performed, the gradation can be reproduced in accordance with a dynamic range enlargement ratio defined by Rules of Specification for Closed Circuit Television Equipment (JEITA TTR-4602B). Base compression curves are selected by selecting closest dynamic ranges with respect to the dynamic range that is greater than the dynamic range value $D_{DML}$ Of the object and the dynamic range that is less than the dynamic range value $D_{DML}$ of the object. For example, as shown in FIG. 7, when a base compression curve corresponding to the dynamic range value $D_{DML}$ of the object exists and when the dynamic range value $D_{DML}$ of the object is 9×, a 16× base compression curve $F_1$ and a 4× base compression curve $F_2$ are selected.

Then, the compressing section 25 forms a compression curve $F_X$ interpolated between the selected base compression curves $F_1$ and $F_2$ as a 9× compression curve corresponding to the dynamic range value $D_{DML}$ of the object (Step S34). Then, the combined image is compressed in accordance with the compression curve (Step S35).

In forming the compression curve by interpolation, for example, if data stored in the storage section 26 includes KNOT points of a spline curve, interpolation may be performed between the KNOT points. The interpolation method may be, for example, linear interpolation or a more sophisticated spline interpolation depending upon the precision of the curve to be obtained. Although the compression curve varies dynamically in accordance with the dynamic range, the range in which the base compression curve moves dynamically is restricted because the interpolation is performed between fixed base compression curves. Therefore, if the base compression curves are formed so that they do not undulate, unlike the base compression curve $F_Y$ shown by a broken line in FIG. 7, it is possible to restrict undulation resulting from movement of the KNOT points during spline interpolation.

The base compression curves that are stored in the storage section 26 are such that the number of curves and the interval between the dynamic ranges are determined by the aforementioned interpolation method and the precision of the curve to be obtained. The larger the number of curves and the smaller the interval between the dynamic ranges, the higher the precision of the compression curve formed by interpolation.

Here, changes in signal level from when the combined image is formed to when the compressed image is formed in the signal processing section 20 of the image pickup device 100 are schematically shown in FIGS. 8A and 8B.

That is, in the combining section 23 of the signal processing section 20 of the image pickup device 100, as shown in FIG. 8A, basically, in accordance with the exposure ratio, the short-time exposure image data $S_S$ is expanded, and is combined with the long-time exposure image data $S_L$ so as to be linearly connected therewith. The compressing section 26 compresses the combined image data $S_{MX}$ using a smooth compression curve $F_Z$ so that an output level of the compressed image is 100% as shown in FIG. 8A.

That is, the image pickup device 100 includes the image pickup section 10, the combining section 23, the dynamic range calculating section 31, the storage section 26, and the compressing section 25. The image pickup section 10 picks up a long-time exposure image having a relatively long exposure time in unit period and a short-time exposure image having a relatively short exposure time in the unit period. The combining section 23 combines the long-time exposure image and the short-time exposure image, obtained by the image pickup section 10, with each other, to generate a combined image, the exposure images being combined with each other on the basis of a ratio between the exposure time $T_L$ of the long-time exposure image and the exposure time $T_S$ of the short-time exposure image. The dynamic range calculating section 31 calculates a dynamic range of an object for the combined image generated at the combining section 23 from the long-time exposure image used in the combining operation, the exposure time $T_L$ of the long-time exposure image, the short-time exposure image used in the combining operation, and the exposure time $T_S$ of the short-time exposure image. The storage section 26 holds base compression curve data corresponding to a few types of dynamic ranges. The compressing section 25, using the base compression curve data held in the storage section 26, calculates a compression curve suitable for the dynamic range of the object calculated by the dynamic range calculating section 31, and generates a compressed image in accordance with the calculated compression curve, the compressed image being generated by compressing the combined image generated by the combining section.

Figure 9:
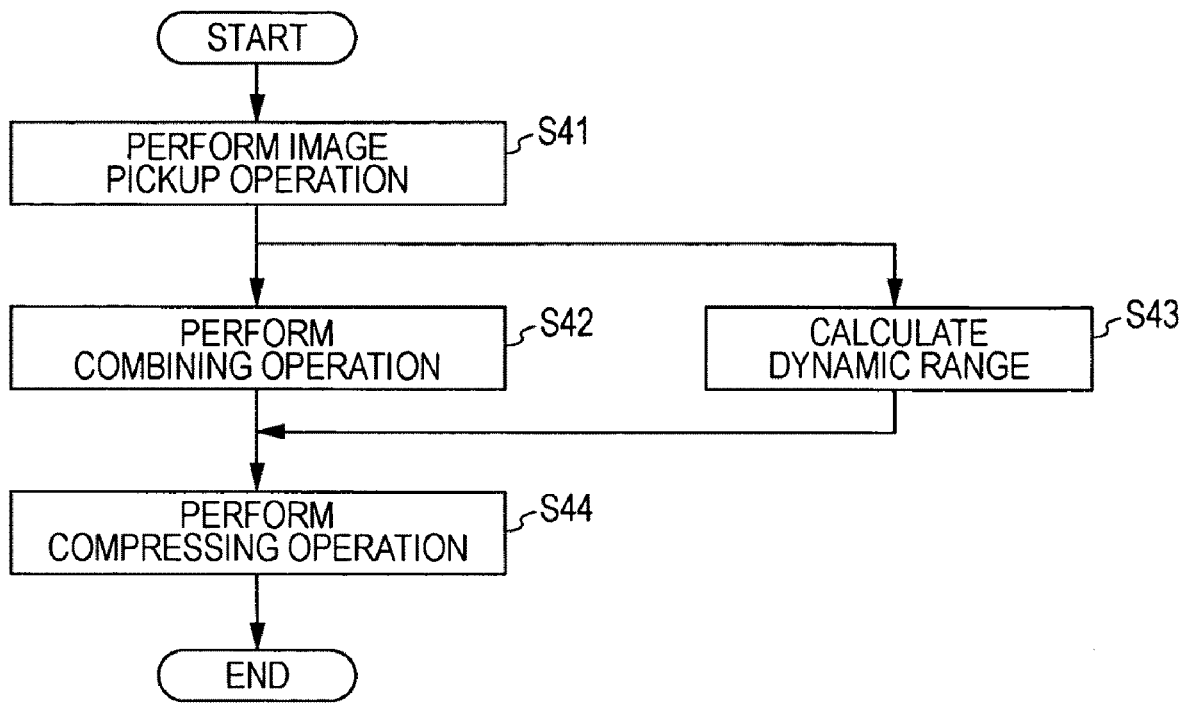
FIG. 9 is a flowchart showing an image pickup process in the image pickup device.

In the image pickup device 100, as shown in the flowchart of FIG. 9, Steps S41 to 44 are carried out. In Step S41 (an image pickup step), the image pickup section 10 picks up a long-time exposure image having a relatively long exposure time and a short-time exposure image having a relatively short exposure time. In Step S42 (a combining step), the combining section 23 combines the long-time exposure image and the short-time exposure image with each other on the basis of the ratio between the exposure time $T_L$ of the long-time exposure image and the exposure time $T_S$ of the short-time exposure image, to form a combined image. In Step S43 (a dynamic range calculation step), the dynamic range calculating section 31 calculates the dynamic range value $D_{DML}$ of the object from the long-time exposure image used in the combining operation, the exposure time of the long-time exposure image, the short-time exposure image used in the combining operation, and the exposure time of the short-time exposure image. In Step S44 (a compressing step), the compressing section 25 calculates the compression curve suitable to the dynamic range value $D_{DML}$ of the object using the base compression curve data held in the storage section 26, and generates the compressed image (formed by compressing the combined image) in accordance with the calculated compression curve. By executing Steps S41 to 44, an image subjected to a gradation compression operation suitable for the dynamic range of the object is generated by a simple controlling operation.

Figure 10:
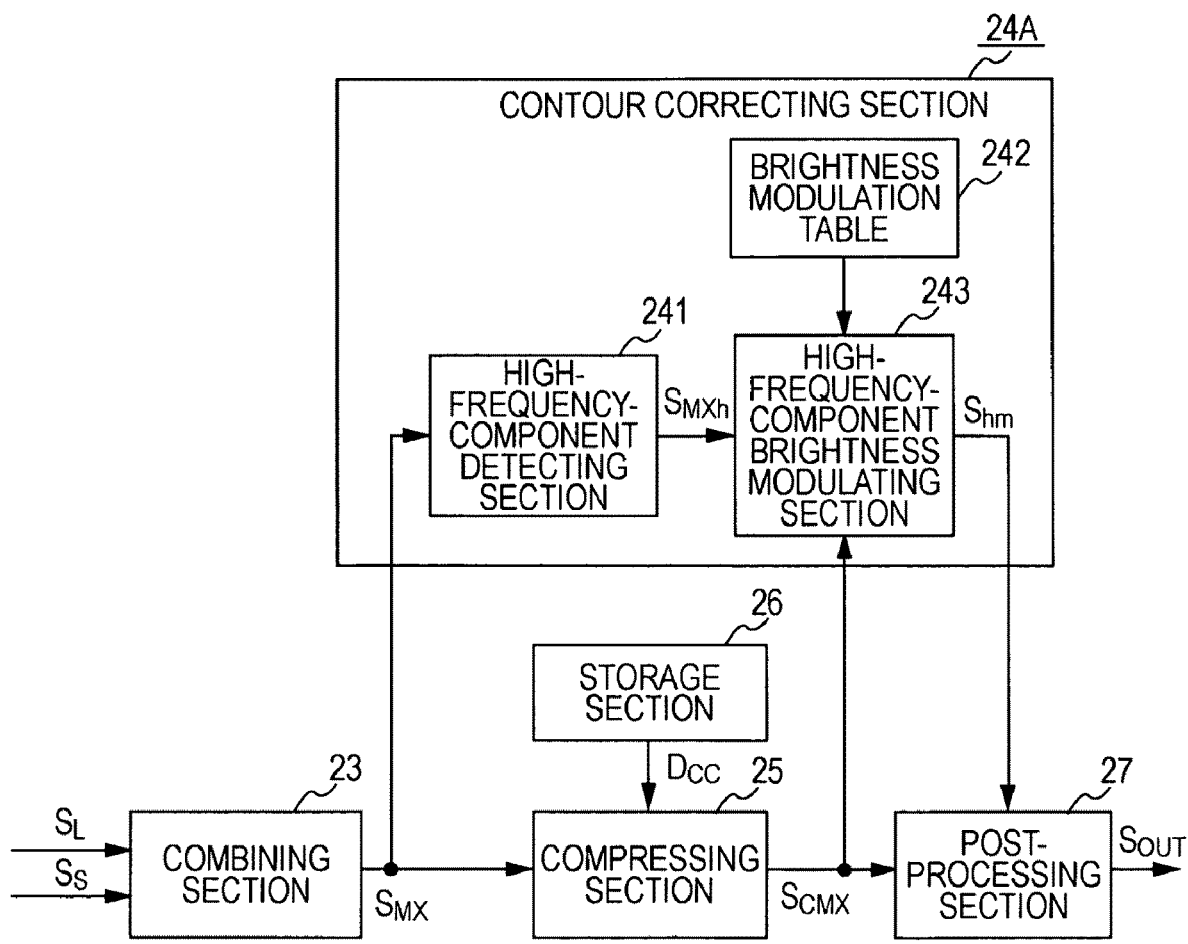
FIG. 10 is a block diagram of an exemplary structure of a contour correcting section provided at the signal processing section of the image pickup device.

The contour correcting section 24 of the signal processing section 20 of the image pickup device 100 is formed, for example, like a contour correcting section 24A shown in FIG. 10.

The contour correcting section 24A includes, for example, a high-frequency component detecting section 241, a brightness modulation table 242, and a high-frequency component brightness modulating section 243. The combined image data $S_{MX}$ obtained by the combining section 23 is supplied to the high-frequency component detecting section 241. The brightness modulation table 242 includes brightness modulation data. The brightness modulation data of the brightness modulation table 242, a detection output of the high-frequency component detecting section 241, and the compressed image data $S_{CMX}$ generated by the compressing section 25 are supplied to the high-frequency component brightness modulating section 243.

In the contour correcting section 24A, the high-frequency component detecting section 241 detects a high-frequency component $S_{MXh}$, such as a contour enhancing component, from the combined image data $S_{MX}$ generated by the combining section 23. Then, the high-frequency component brightness modulating section 243 applies gain to the detected combined-image high-frequency component $S_{MXh}$ in accordance with the brightness level of the combined image or the brightness level of the compressed image generated by the compressing section 24. By this, gain control is performed on the high-frequency component $S_{MXh}$ of the combined image, and the high-frequency component $S_{MXh}$ of the combined image subjected to the gain control is supplied to the post-processing section 27 as the high frequency component $S_{hm}$ for contour correction.

By this, the post-processing section 27 adds the high-frequency component $S_{hm}$ for contour correction to the compressed image data $S_{CMX}$ generated by the compressing section 24. This makes it possible to enhance the contour, in which detection is difficult after compressing the image.

For example, brightness modulation degree data of the high-frequency component may be formed from a compression curve, or may be provided to the high-frequency component brightness modulating section 243 from the brightness modulation table 242.

Figure 11:
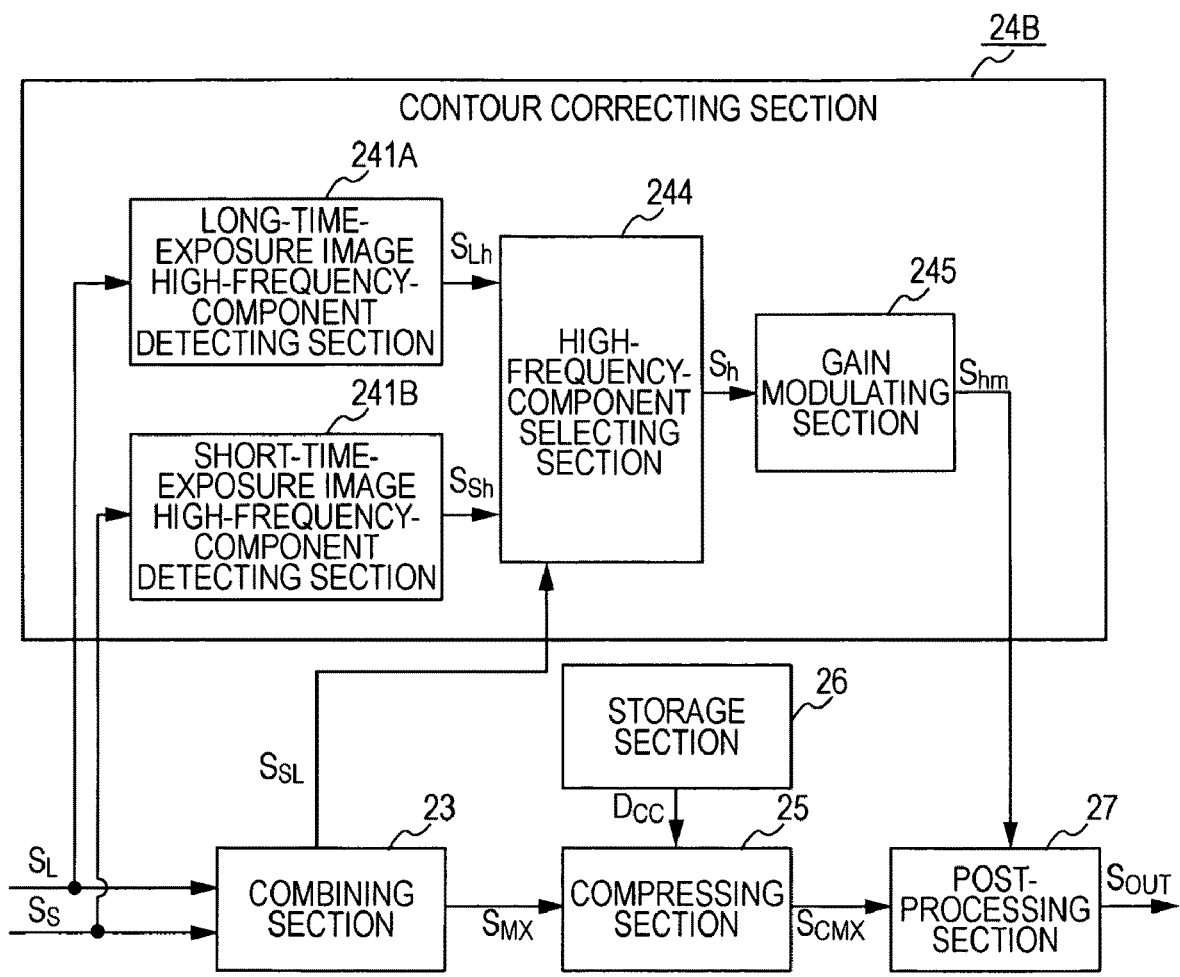
FIG. 11 is a block diagram of another exemplary structure of a contour correcting section provided at the signal processing section of the image pickup device.

The contour correcting section 24 of the signal processing section 20 of the image pickup device 100 may be formed, for example, like a contour correcting section 24B shown in FIG. 11.

The contour correcting section 24B includes, for example, a long-time exposure image high-frequency component detecting section 241A, a short-time exposure image high-frequency component detecting section 241B, a high-frequency component selecting section 244, and a gain modulating section 245. From the pre-processing section 21, the long-time exposure image data $S_L$ is supplied to the long-time exposure image high-frequency component detecting section 241A. From the pre-processing section 21, the short-time exposure image data $S_S$ is supplied to the short-time exposure image high-frequency component detecting section 241B. The high-frequency component selecting section 244 selects an output of the long-time exposure image high-frequency component detecting section 241A and an output of the short-time exposure image high-frequency component detecting section 241B. A high-frequency component $S_h$ selected by the high-frequency component selecting section 244 is supplied to the gain modulating section 245.

In the contour correcting section 24B, the long-time exposure image high-frequency component detecting section 241A and the short-time exposure image high-frequency component detecting section 241B detect the high-frequency components from the long-time exposure image data $S_L$ and the short-time exposure image data $S_S$ supplied from the pre-processing section 21.

A selection signal $S_{SL}$ indicating which of the long-time exposure image and the short-time exposure image is selected with each pixel at the combining section 23 is supplied to the high-frequency component selecting section 244. In accordance with the selection signal $S_{SL}$, the high-frequency component selecting section 244 selects a long-time exposure image high-frequency component $S_{Lh}$ detected by the long-time exposure image high-frequency component detecting section 241A from the long-time exposure image data $S_L$ and a short-time exposure image high-frequency component $S_{Sh}$ detected by the short-time exposure image high-frequency component detecting section 241B from the short-time exposure image data $S_S$. The selected high-frequency component $S_h$ is supplied to the gain modulating section 245.

The gain modulating section 245 applies modulation gain to the high-frequency component $S_h$ supplied from the high-frequency component selecting section 24, and supplies the resulting high-frequency component to the post-processing section 27 as the high-frequency component $S_h$ for contour correction.

By this, the post-processing section 27 adds the high-frequency component $S_{hm}$ for contour correction to the compressed image data $S_{CMX}$ generated by the compressing section 24. This makes it possible to enhance the contour, in which detection is difficult after compressing the image.

Figure 12:
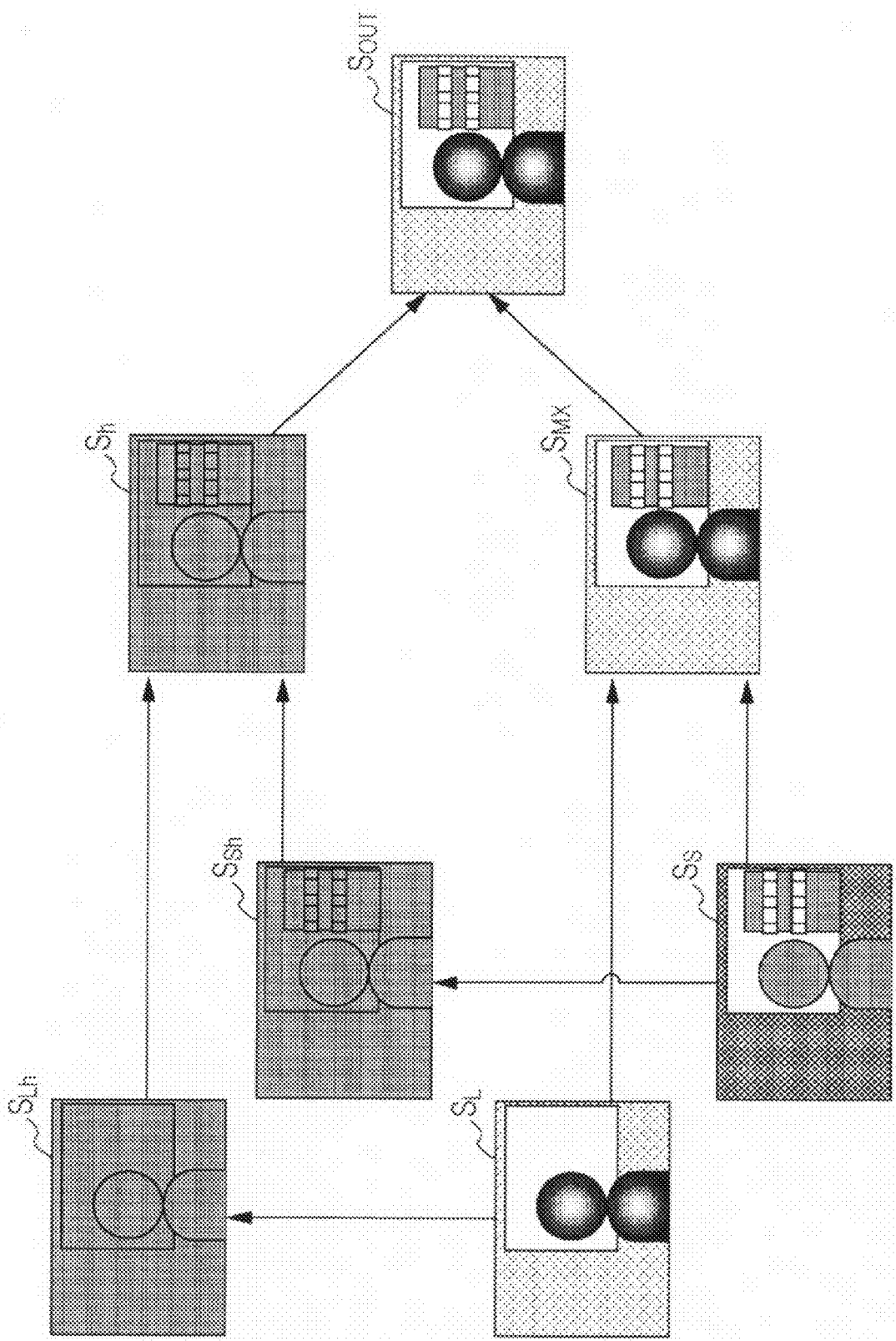
FIG. 12 schematically shows images of correcting contour by the contour correcting section.

Here, images of correcting the contour by the contour correcting section 24B are shown in FIG. 12.

That is, the contour correcting section 24B detects the high-frequency component $S_{Lh}$ from the long-time exposure image data $S_L$ and the high-frequency component $S_{Sh}$ from the short-time exposure image data $S_S$, and the high-frequency component $S_h$ (in which, when forming the combined image data $S_{MX}$, a high-frequency component that is selected in accordance with which of the long-time exposure and short-time exposure is selected is combined). The generated high-frequency component $S_h$ is added to the combined image data $S_{MX}$ as the high-frequency component $S_{hm}$ for contour correction, to enhance the contour.

Figure 13:
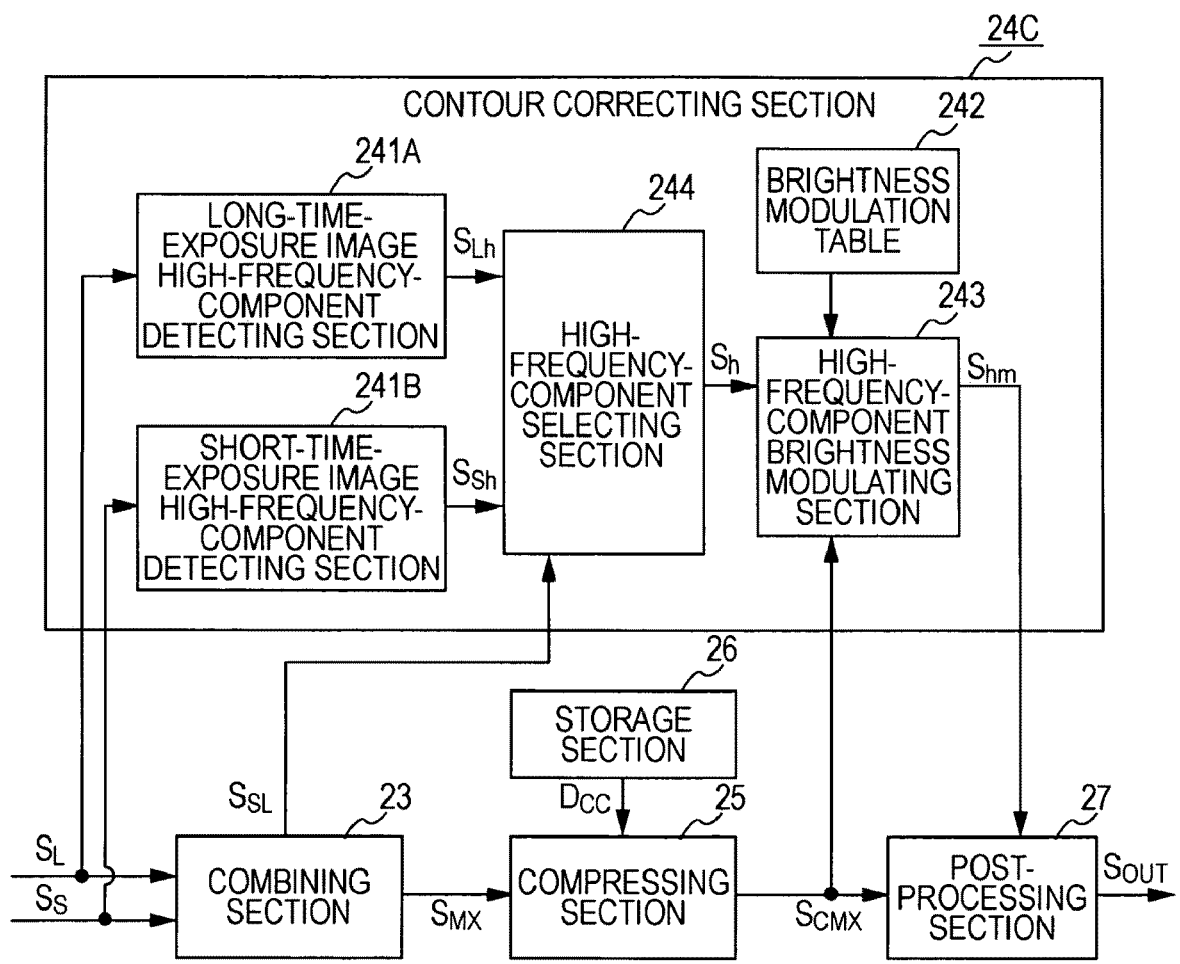
FIG. 13 is a block diagram of still another exemplary structure of a contour correcting section provided at the signal processing section of the image pickup device.

Further, the contour correcting section 24 of the signal processing section 20 of the image pickup device 100 may be formed, for example, like a contour correcting section 24C shown in FIG. 13.

The contour correcting section 24C includes, for example, a long-time exposure image high-frequency component detecting section 241A, a short-time exposure image high-frequency component detecting section 241B, a high-frequency component selecting section 244, a brightness modulation table 242, and a high-frequency component brightness modulating section 243. From the pre-processing section 21, the long-time exposure image data $S_L$ is supplied to the long-time exposure image high-frequency component detecting section 241A. From the pre-processing section 21, the short-time exposure image data $S_S$ is supplied to the short-time exposure image high-frequency component detecting section 241B. The high-frequency component selecting section 244 selects an output of the long-time exposure image high-frequency component detecting section 241A and an output of the short-time exposure image high-frequency component detecting section 241B. The brightness modulation table 242 includes brightness modulation data. The brightness modulation data of the brightness modulation table 242 and the high-frequency component $S_h$ selected by the high-frequency component selecting section 244 are supplied to the high-frequency component brightness modulating section 243.

In the contour correcting section 24C, the long-time exposure image high-frequency component detecting section 241A and the short-time exposure image high-frequency component detecting section 241B detect the high-frequency components from the long-time exposure image data $S_L$ and the short-time exposure image data $S_S$ supplied from the pre-processing section 21.

A selection signal $S_{SL}$ indicating which of the long-time exposure image and the short-time exposure image is selected with each pixel at the combining section 23 is supplied to the high-frequency component selecting section 244. In accordance with the selection signal $S_{SL}$, the high-frequency component selecting section 244 selects a long-time exposure image high-frequency component $S_{Lh}$ detected by the long-time exposure image high-frequency component detecting section 241A from the long-time exposure image data $S_L$ and a short-time exposure image high-frequency component $S_{Sh}$ detected by the short-time exposure image high-frequency component detecting section 241B from the short-time exposure image data $S_S$. The selected high-frequency component $S_h$ is supplied to the high-frequency component brightness modulating section 243.

The high-frequency component brightness modulating section 243 performs gain control on the high-frequency component $S_h$ by applying gain to the high-frequency component $S_h$ supplied from the high-frequency component selecting section 244 in accordance with the brightness level of the compressed image generated by the compressing section 24. Then, the high-frequency component brightness modulating section 243 supplies the high-frequency component $S_h$ subjected to the gain control as the high-frequency component $S_{hm}$ for contour correction to the post-processing section 27.

By this, the post-processing section 27 adds the high-frequency component $S_{hm}$ for contour correction to the compressed image data $S_{CMX}$ generated by the compressing section 24. This makes it possible to enhance the contour, in which detection is difficult after compressing the image.

For example, the brightness modulation degree data of the high-frequency component may be formed from a compression curve, or may be provided to the high-frequency component brightness modulating section 243 from the brightness modulation table 242.

The present application contains subject matter related to that disclosed in Japanese Priority Patent Application JP 2008-146232 filed in the Japan Patent Office on Jun. 3, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image pickup device comprising at least:
    an image pickup section that picks up a long-time exposure image having a relatively long exposure time in unit period and a short-time exposure image having a relatively short exposure time in the unit period;
    a combining section that combines the long-time exposure image and the short-time exposure image, obtained by the image pickup section, with each other, to generate a combined image, the exposure images being combined with each other on the basis of a ratio between the exposure time of the long-time exposure image and the exposure time of the short-time exposure image;
    a dynamic range calculating section that calculates a dynamic range of an object for the combined image generated at the combining section from the long-time exposure image used in the combining operation, the exposure time of the long-time exposure image, the short-time exposure image used in the combining operation, and the exposure time of the short-time exposure image;
    a storage section that holds base compression curve data corresponding to a few types of dynamic ranges; and
    a compressing section that, using the base compression curve data held in the storage section, calculates a compression curve suitable for the dynamic range of the object calculated by the dynamic range calculating section, and that generates a compressed image in accordance with the calculated compression curve, the compressed image being generated by compressing the combined image generated by the combining section,
    wherein an image subjected to a gradation compression operation in accordance with the dynamic range of the object is generated from the long-time exposure image and the short-time exposure image obtained by the image pickup section.

2. The image pickup device according to claim 1, wherein the dynamic range calculating section previously determines a maximum value of the dynamic range of the object that is capable of being represented by the long-time exposure image, and multiplies the ratio between the exposure time of the long-time exposure image and the exposure time of the short-time exposure image, to calculate the dynamic range of the object picked up by the image pickup section.

3. The image pickup device according to claim 1, wherein the dynamic range calculating section calculates a proportion with respect to a saturation level of the long-time exposure image from a maximum brightness value of the long-time exposure image, and multiplies the proportion with the dynamic range of the object that is capable of being represented by the long-time exposure image, to calculate the dynamic range of the object picked up by the image pickup section.

4. The image pickup device according to claim 3, wherein, using a histogram, formed from the obtained long-time exposure image, and brightness integration values corresponding thereto, the dynamic range calculating section detects the brightness integration value and the number of pixels in the histogram including a specified nth pixel when counting the integration values in order of a larger brightness value to a smaller brightness value, and divides the brightness integration value in an area thereof by the number of pixels, to calculate an average brightness value that is set as the maximum brightness value of the long-time exposure image.

5. The image pickup device according to claim 1, wherein the compressing section includes compression curve generating means for selecting and reading out two types of the base compression curve data that are closest to the dynamic range of the object, and performing interpolation in terms of the two types of base compression curve data on the basis of the dynamic range of the object, to generate a suitable compression curve, and wherein, in accordance with the compression curve generated by the compression curve generating means, the compressing section generates the compressed image formed by compressing the combined image generated by the combining section.

6. The image pickup device according to claim 1, further comprising:

a contour correcting section including combined image high-frequency component detecting means for detecting a high-frequency component of the combined image generated by the combining section; gain controlling means for performing gain control of the high-frequency component of the combined image by applying gain to the high-frequency component of the combined image detected by the combined image high-frequency component detecting means, the gain being in accordance with a brightness level of the combined image or a brightness level of the compressed image generated by the compressing section; and high-frequency component adding means for adding the high-frequency component of the combined image subjected to the gain control by the gain controlling means to the compressed image generated by the compressing means.

7. The image pickup device according to claim 1, further comprising:

a contour correcting section including long-time exposure high-frequency component detecting means for detecting a high-frequency component of the long-time exposure image used in the combining operation at the combining section; short-time exposure high-frequency component detecting means for detecting a high-frequency component of the short-time exposure image used in the combining operation at the combining section; and high-frequency component adding means for adding to the compressed image the long-time exposure high-frequency component detected by the long-time exposure high-frequency component detecting means or the short-time exposure component detected by the short-time exposure high-frequency component detecting means so as to correspond to a pixel used from the long-time exposure image or the short-time exposure image, combined by the combining section.

8. The image pickup device according to claim 7, wherein the contour correcting section includes gain controlling means for performing gain control on the high-frequency component, which is added to the compressed image by the high-frequency component adding means, by applying gain to the high-frequency component, the gain corresponding to a brightness level of the combined image generated by the combining section or a brightness level of the compressed image generated by the compressing section.

9. An image pickup method comprising at least the steps of:

picking up a long-time exposure image having a relatively long exposure time and a short-time exposure image having a relatively short exposure time with an image pickup section;

generating a combined image by combining the obtained long-time exposure image and short-time exposure image with each other on the basis of a ratio between the exposure time of the long-time exposure image and the exposure time of the short-time exposure image;

calculating a dynamic range of an object from the long-time exposure image used in the combining operation, the exposure time of the long-time exposure image, the short-time exposure image used in the combining operation, and the exposure time of the short-time exposure image; and generating a compressed image by calculating a compression curve suitable for the calculated dynamic range of the object using base compression curve data held in a storage section, and by compressing the combined image, generated in the step of generating the combined image, in accordance with the calculated compression curve, wherein an image subjected to a gradation compression operation in accordance with the dynamic range of the object is generated from the long-time exposure image and the short-time exposure image obtained by the image pickup step.

* * * * *